May 29, 1934.    H. SIEDENTOPF    1,960,554
ILLUMINATION DEVICE FOR MICROSCOPES
Filed July 7, 1930
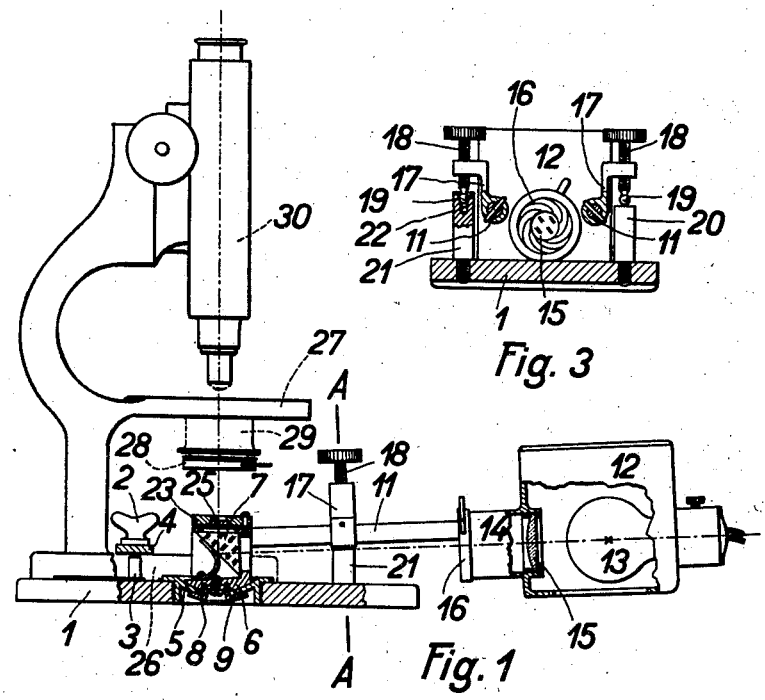
Fig. 3
Fig. 1
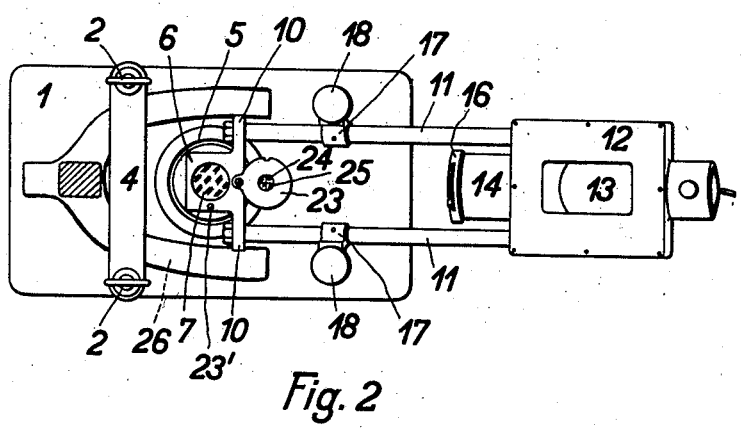
Fig. 2
Inventor:
Henry Siedentopf Patented May 29, 1934

1,960,554

UNITED STATES PATENT OFFICE 1,960,554

ILLUMINATION DEVICE FOR MICROSCOPES

Henry Siedentopf, Jena, Germany, assignor to the firm of Carl Zeiss, Jena, Germany Application July 7, 1930, Serial No. 466,163
In Germany July 13, 1929

7 Claims. (Cl. 88—40)

Illuminating microscopic objects in transmitted light is generally effected by a plane or concave mirror mounted in gimbals and any light source that throws on the mirror a more or less converging pencil of light rays. The mirror reflects the light rays approximately in the direction of the optical axis of the microscope in such a manner that they illuminate the object either direct or after having passed through a condenser. With this kind of illumination the exact adjustment or control of the illumination device is difficult and the centration of the light pencil frequently very inaccurate.

The object of the present invention is to provide for microscopes an illumination device of which, according to the invention, the mirror is rigidly connected with the source of light for rotation about a point on the optical axis of the microscope. An illumination of this kind will not have the said disadvantages if the centre of rotation is made to lie on the axis of the light pencil reflected by the mirror. Once having been adjusted this position is maintained also when the mirror is rotated, because the light source partakes of the rotations and, consequently, has always the same position relative to the mirror. To avoid reflexions as are caused on the surface of glass mirrors with silvered back, the mirror is conveniently constructed as an angular prism whose reflecting surface, if so required, may be vaulted, in which case the centre of the turning movements is transferred approximately into the light exit surface of this prism.

The adjustment of the illumination device relative to the miscroscope may be facilitated by improving the device in providing a mark indicating the centre of the turning movements. This mark serving only for the adjustment and being superfluous, if not disturbing, in microscopic observation, it is preferably not rigidly arranged but constructed in such a manner that it allows of being brought into the path of the illuminating rays only when necessary.

The illumination device is appropriately supported by a base plate on which the prism is movably provided in a spherical surface and the microscope so disposed that the centre of the spherical surface lies in its optical axis. For allowing the necessary turning movements the most simple way is to provide laterally of the prism or, respectively, the prism casing two supports carrying the case of the light source and being held by the base plate in such a manner that they can be vertically adjusted by means of screws. Rotating these supporting screws causes the prism to turn about the centre of the spherical surface, of which movement the light source partakes.

The accompanying drawing, which illustrates a constructional example of the invention, shows the device in Fig. 1 in a side view and, partly, in a central section, in Fig. 2 in a diagram, and in Fig. 3 in a section on line A—A of Fig. 1.

The device has a base plate 1 which is provided with an appliance for fixing microscope stands that consists of two threaded bolts 3 with thumb nuts 2 and a holding bar 4. The plate 1 has a recess which takes a spherical plate 5. In this spherical plate 5 rests a displaceable prism casing 6 containing an isosceles reflecting prism 7. A spherical counter-plate 9 which is screwed to the casing 6 through a central bore 8 in the spherical plate 5, prevents the casing 6 from being lifted out of its bearing. In the medial position of the casing 6 the light entrance surface of the prism 7 is slightly inclined towards the perpendicular plane, whereas its light exit surface is horizontal. The casing 6 has two lateral shoulders 10 to which are fixed two supporting rods 11 in such a manner that their longitudinal axis is perpendicular to the light entrance surface of the prism 7. Their free ends carry the casing 12 of a light source 13. Behind the light source 13 a condenser 15 and an iris diaphragm 16 are disposed in a barrel 14 attached to the casing 12. The supporting rods 11 rest in sleeves 17 which allow of being vertically adjusted by means of screws 18. The screws 18 have at their ends balls 19 which rest against blocks 20 and 21, whereby one of the balls 19 goes into a conical hole 22 and the other lies on a horizontal surface. Above the light exit surface of the prism 7, on the prism casing 6, is rotatably disposed a diaphragm 23 whose diaphragm aperture is covered by a frosted glass disc 25 having a cross mark 24. In the position represented in Fig. 1, in which the diaphragm 23 touches a stop 23', the point of intersection of the mark 24 indicates the centre of the spherical plate 5.

In the drawing a microscope adapted to be used together with the illumination device is indicated by dotted lines. The microscope comprises a horseshoe base 26, a stage 27 having a sliding sleeve 29 with condenser and iris diaphragm, 28, and a microscope tube 30.

Before using the illumination device, first the microscope base 26 has to be clamped under the bar 4 by means of the thumb nuts 2 into a position in which the optical axis of the tube 30 goes through the spherical centre of the spherical plate 5. To test this position the condenser 28 is removed and the tube adjusted relatively to the mark 24, while the ground glass disc 25 is illuminated by means of the light source 13, and the diaphragm 23 so turned into the path of the illuminating rays that it touches the stop 23'. The microscope must be moved until the intersection point of the mark 24 coincides with the centre of the microscopic field of view. By manipulating the screws 18 the prism 7 is now turned about the intersection point of the cross mark 24 till both cross-lines appear uniformly sharp; hereby it is attained that the plane of the mark 24 perpendicularly intersects the optical axis of the tube 30, viz. that the axis of the pencil of illuminating rays emanating from the prism 7 coincides with the optical axis of the tube. As soon as microscope and illuminating device have thus been mutually adjusted the device can be used, whereby the diaphragm must be turned out of the path of the illuminating rays, and, as a rule, the condenser 28 pushed into the sliding sleeve 29. The device is given such dimensions that the light source 13 is imaged by the condenser 15 in the diaphragm plane of the condenser 28 and the diaphragm 16 by the condenser 28 in the object plane on the surface of the stage 27. The diaphragm 16 acts as a diaphragm for the illuminated field and the diaphragm of the condenser 28 as an aperture diaphragm for the pencil of illuminating rays.

I claim:

1. An illumination device for microscopes, comprising a base plate, means for fixing a microscope to the base plate, a mirror, a light source rigidly connected to the mirror, the mirror and the light source being mounted on the base plate, and means for universally rotating the mirror and the light source simultaneously about a point.

2. An illumination device for microscopes, comprising a base plate, means for fixing a microscope to the base plate, a mirror mounted in a spherical surface in the base plate, a light source rigidly connected to the mirror, and means for universally rotating the mirror and the light source simultaneously about the centre of the spherical surface.

3. An illumination device for microscopes, comprising a base plate, means for fixing a microscope to the base plate, a reflecting prism and a light source rigidly connected to the said prism, the prism and the light source being mounted on the base plate and means for universally rotating the prism and the light source simultaneously about a point, the said point lying closely above that surface of the prism from which emanate the rays of the light source that are received by the prism.

4. An illumination device for microscopes, comprising a base plate, means for fixing a microscope to the base plate, a mirror, a light source rigidly connected to the mirror, the mirror and the light source being mounted on the base plate, means for universally rotating the mirror and the light source simultaneously about a point, and a mark provided closely above the mirror and coinciding with the said point.

5. An illumination device for microscopes, comprising a base plate, means for fixing a microscope to the base plate, a mirror, a light source rigidly connected to the mirror, the mirror and the light source being mounted on the base plate, means for universally rotating the mirror and the light source simultaneously about a point and a mark removably provided closely above the mirror and coinciding with the said point.

6. An illumination device for microscopes, comprising a base plate, means for fixing a microscope to the base plate, a mirror mounted in a spherical surface in the base plate, a light source, two supporting rods connecting the light source and the mirror and being provided with two screws for the adjustment of these supporting rods relative to the base plate.

7. The combination of a base plate, a microscope disposed on this base plate, a reflecting prism, a light source rigidly connected with the reflecting prism, the reflecting prism and the light source being mounted in a spherical surface that is provided in the base plate and through the centre of which passes the axis of the microscope, and means for universally rotating the prism and the light source simultaneously.

HENRY SIEDENTOPF.